(12) United States Patent
Holthaus et al.

(10) Patent No.: US 12,369,610 B2
(45) Date of Patent: Jul. 29, 2025

(54) GUM ARABIC

(71) Applicant: CORN PRODUCTS DEVELOPMENT, INC, Westchester, IL (US)

(72) Inventors: Derek Holthaus, Bridgewater, NJ (US); Sarfaraz Patel, Bridgewater, NJ (US); Scott Magness, Bridgewater, NJ (US); Afaf Makarious, Bridgewater, NJ (US)

(73) Assignee: Corn Products Development, Inc., Westchester, IL (US)

( * ) Notice: Subject to any disclaimer, the term of this patent is extended or adjusted under 35 U.S.C. 154(b) by 473 days.

(21) Appl. No.: 17/636,176

(22) PCT Filed: Aug. 7, 2020

(86) PCT No.: PCT/US2020/045447
§ 371 (c)(1),
(2) Date: Feb. 17, 2022

(87) PCT Pub. No.: WO2021/041005
PCT Pub. Date: Mar. 4, 2021

(65) Prior Publication Data
US 2022/0338518 A1    Oct. 27, 2022

Related U.S. Application Data

(60) Provisional application No. 63/060,316, filed on Aug. 3, 2020, provisional application No. 62/891,858, filed on Aug. 26, 2019.

(51) Int. Cl.
| | | |
|---|---|---|
| A23L 27/00 | (2016.01) | |
| A23L 27/12 | (2016.01) | |
| A23L 29/25 | (2016.01) | |

(52) U.S. Cl.
CPC ............. *A23L 27/80* (2016.08); *A23L 27/12* (2016.08); *A23L 29/25* (2016.08); *A23V 2250/5028* (2013.01)

(58) Field of Classification Search
CPC .......... A23L 27/80; A23L 27/12; A23L 29/25; A23L 27/13; A23L 2/44; A23L 2/52; A23L 2/56; A23L 2/58; A23L 2/60; A23L 2/68; A23V 2250/5028; A23V 2002/00; A23V 2200/222; A23V 2300/10; A23V 2300/24; A23V 2300/34; A23V 2250/02; A23V 2250/032; A23V 2250/194; A23V 2250/628; C08B 37/0087; C08L 5/00; C08J 3/122
USPC ......................................................... 426/93
See application file for complete search history.

(56) References Cited

U.S. PATENT DOCUMENTS

| | | |
|---|---|---|
| 8,722,129 B2 | 5/2014 | Sasaki et al. |
| 2005/0158440 A1 | 7/2005 | Hayashi |
| 2006/0240166 A1 | 10/2006 | Al-Assaf et al. |
| 2007/0031566 A1* | 2/2007 | Sasaki ................ C08B 37/0087 426/573 |
| 2019/0200660 A1 | 7/2019 | Miyamoto et al. |

FOREIGN PATENT DOCUMENTS

| | | |
|---|---|---|
| CN | 1771263 A | 5/2006 |
| CN | 109788789 A | 5/2019 |
| EP | 1505078 A1 | 2/2005 |
| JP | 3600833 B2 | 12/2004 |
| JP | WO2008047846 | 2/2010 |
| WO | 2003093324 | 11/2003 |
| WO | 2004089991 A1 | 10/2004 |
| WO | 2005026213 A | 3/2005 |

\* cited by examiner

*Primary Examiner* — Erik Kashnikow
*Assistant Examiner* — Bhaskar Mukhopadhyay

(57) ABSTRACT

Disclosed herein is a method for producing modified gum arabic, the method comprising: providing gum arabic; heating said gum arabic, resulting in heat-treated gum arabic; dissolving said heat-treated gum arabic in a solution; optionally, filtering said solution containing said dissolved gum arabic; and subjecting said solution containing said dissolved gum arabic to spray-drying. Further disclosed herein is a gum arabic from *Acacia Senegal* having (i) a weight average molecular weight ($M_w$) of $\geq 3.8 \cdot 10^6$ Da, and/or (ii) a RMS-radius of gyration ($R_g$) of $\geq 140$ nm.

18 Claims, 3 Drawing Sheets

GUM ARABIC

CROSS-REFERENCE TO RELATED APPLICATIONS

This application is a US National Stage under 35 USC § 371 of International Application No. PCT/US2020/045447, filed Aug. 7, 2020, which claims priority to U.S. Provisional Application Ser. No. 62/891,858, filed Aug. 26, 2019 and U.S. Provisional Application Ser. No. 63/060,316, filed Aug. 3, 2020, which are incorporated herein by reference in all its entirety for all purposes.

Disclosed herein is gum arabic and methods for producing a modified gum arabic.

Gum arabic is a known emulsifier used in a wide variety of foods.

Gum arabic may be from *Acacia Senegal* or *Acacia Seyal*. Gum arabic from *Acacia Senegal* is most commonly used for emulsions.

It is known that the emulsifying properties of gum arabic may be improved by heat treating the gum arabic. This is for instance described in JP-H-2-49001, JP-A-2000/166489, WO 2004/089991, and EP 1 666 502 A1.

WO 2004/089991 states that gum arabic comprises arabinogalactan (AG), glycoprotein (GP), and arabinogalactan protein (AGP) as its major components. An analysis process, referred to as "GPC-MALLS", is also described which involves Gel Permeation Chromatography, wherein three detectors (i.e., a multi angle laser light scattering (MALLS) detector, a refractive index (RI) detector and an ultraviolet (UV) detector) are coupled on-line. This technique enables the gum arabic to be analyzed with respect to, amongst others, its AGP content, weight average molecular weight ($M_w$), polydispersity (P), and RMS-radius of gyration ($R_g$), the latter according to WO 2004/089991 being an indicator of molecular size. WO 2004/089991 further states that the AGP content and the weight average molecular weight ($M_w$) may be increased by heating the gum Arabic, and that emulsifying ability improves as the $M_w$ and AGP content increases. According to WO 2004/089991, the $M_w$ should preferably be at least $0.9 \cdot 10^6$ Dalton and less than $2.5 \cdot 10^6$ Dalton, the highest exemplified values for gum arabic from *Acacia Senegal* being about $2 \cdot 10^6$ Dalton. In the examples, $R_g$ values varying between 42.3 to 138 nm are obtained.

EP 1 666 502 A1 describes a heating process for gum arabic under dry conditions while applying a small particle size. EP 1 666 502 discloses that the emulsifying ability is usually improved with an increase in the $M_w$ or AGP content, but that when gum arabic is excessively modified, the emulsifying ability is lowered. It also discloses that a high (P) provides a gum arabic with an unsatisfactory degree of modification and efficiency, and that, when the particle diameter of the gum arabic is large, the (P) gets too high.

Although WO 2004/089991 and EP 1 666 502 A1 mention that stable emulsions may be obtained using heat-treated gum arabic, these documents generally disclose testing of the emulsifying ability at high usage levels of gum arabic relative to the amount of oil to be emulsified, i.e. a ratio of gum arabic to oil of about 1:1. A high usage level of gum arabic is commercially disadvantageous, since it is less economical. Although WO 2004/089991 discloses in one instance lower usage levels, this is reported to result in emulsions having a relatively large particle diameter, which is disadvantageous.

WO 2004/089991 and EP 1 666 502 A1 disclose that spray-dried gum arabic may be subjected to a heat-treatment process. However, the present inventors found that, if spray dried gum arabic or heated spray dried gum arabic is added to a solution, the solution becomes turbid under certain circumstances. This is disadvantageous, in particular if a clear solution, e.g. a clear beverage, is desired.

Furthermore, the inventors found that increasing the $M_w$ by heat treatment causes the viscosity of the solution to which the gum Arabic is added to increase. A solution having a viscosity that is too high, however, is disadvantageous because it makes processing, of for e.g. the emulsion, difficult.

In view of the above, there is need for a gum arabic having improved properties and a method for producing such improved gum arabic.

A first aspect disclosed herein is directed to a method for producing modified gum arabic, the method comprising: providing gum arabic; heating said gum arabic, resulting in heat-treated gum arabic; dissolving said heat-treated gum arabic in a solution; optionally, filtering said solution containing said dissolved gum arabic; and subjecting said solution containing said dissolved gum arabic to spray-drying.

A second aspect disclosed herein is directed to a method for producing modified gum arabic, the method comprising: providing gum arabic having a Mw of $\geq 0.9 \cdot 10^6$ Da; dissolving said gum arabic in a solution; optionally, filtering said solution containing said dissolved gum arabic; and subjecting said solution containing said dissolved gum arabic to spray-drying.

A third aspect disclosed herein is directed to a gum arabic obtained or obtainable by the method according to the first or second aspect disclosed herein.

A fourth aspect disclosed herein is directed to a gum arabic from *Acacia Senegal* having (i) a $M_w$ of $\geq 3.8 \cdot 10^6$ Da, and/or (ii) a $R_g$ of $\geq 140$ nm. The gum arabic according to the fourth aspect disclosed herein may be obtained or obtainable by the method according to the first or second aspect disclosed herein.

A fifth aspect disclosed herein is directed to an emulsifier composition comprising gum arabic according to the third or fourth aspect disclosed herein.

A sixth aspect disclosed herein provides an emulsion comprising gum arabic according to the third or fourth aspect disclosed herein and/or the emulsifier composition according to the fifth aspect disclosed herein.

A seventh aspect disclosed herein provides the use of the gum arabic according to the third or fourth aspect disclosed herein as an emulsifier.

An eighth aspect disclosed herein provides a method for preparing an emulsion according to the sixth aspect disclosed herein, the method comprising dispersing an oil phase in an aqueous phase using high pressure homogenization.

A ninth aspect disclosed herein provides a food product comprising gum arabic according to the third or fourth aspect described herein and/or an emulsion according to the sixth aspect described herein.

Surprisingly, it is found that spray drying heat-treated gum arabic and/or gum arabic having an increased Mw enables a modified gum arabic having a substantially increased Mw and/or Rg to be obtained. Gum arabic having this increased Mw and/or Rg exhibits excellent emulsifying ability.

In particular, the gum arabic according to the invention enables a low usage level of gum Arabic to be used in the emulsion and/or stabilizes emulsions having a high oil content. Further, it is found that the emulsification properties of the gum according to the invention are excellent, even if the (P) is high. This is surprising, since the prior art advocates that a low (P) is desirable. Moreover, a solution containing gum arabic according to one or more aspect described herein has a relatively limited increase in viscosity and limited to no increase in turbidity.

METHODS FOR PRODUCING MODIFIED GUM ARABIC

Figure 1:
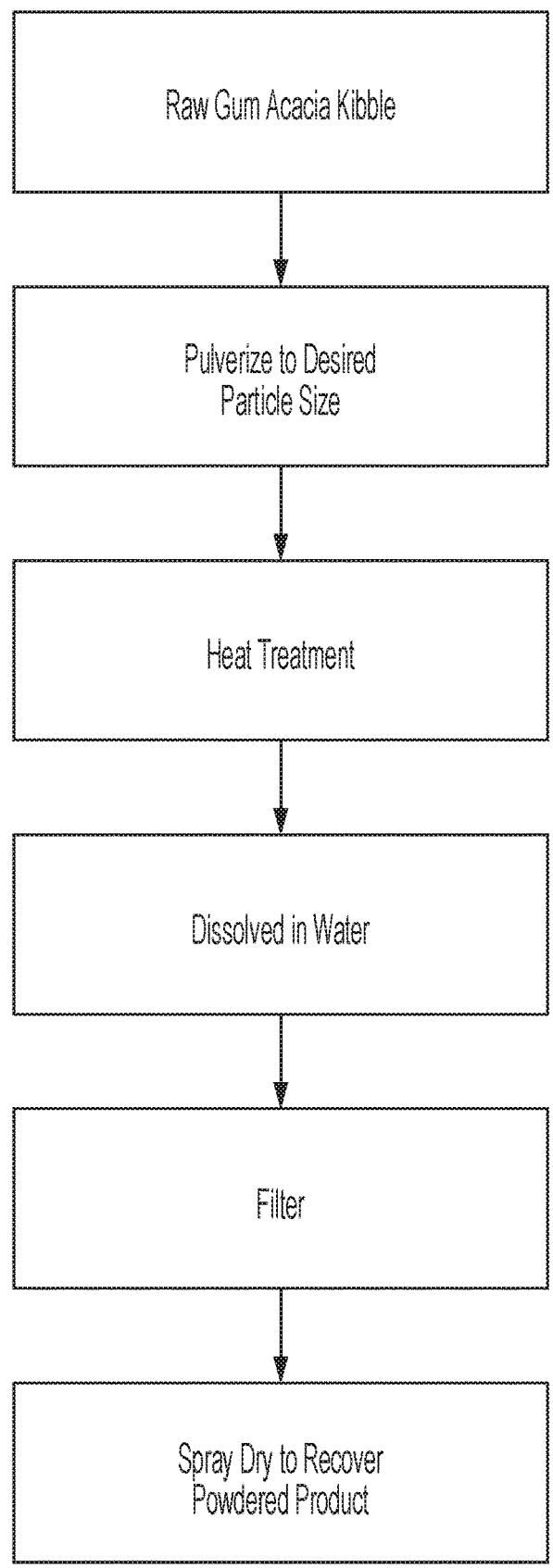
FIG. 1 provides a schematic overview of an embodiment of the method according to the invention.

A first aspect of the invention provides a method for producing modified gum arabic, the method comprising: providing gum arabic; heating said gum arabic, resulting in heat-treated gum arabic; dissolving said heat-treated gum arabic in a solution; optionally, filtering said solution containing said dissolved gum arabic; and subjecting said solution containing said dissolved gum arabic to spray-drying.

A second aspect of the invention provides a method for producing modified gum arabic, the method comprising: providing gum arabic having a weight average molecular weight ($M_w$) of $\geq 0.9 \cdot 10^6$ Da; dissolving said gum arabic in a solution; optionally, filtering said solution containing said dissolved gum arabic; and subjecting said solution containing said dissolved gum arabic to spray-drying.

Heat treating gum arabic increases the weight average molecular weight (Mw) of the gum arabic. Accordingly, the skilled person will appreciate that providing gum arabic having a Mw as defined in the method according to the second aspect may advantageously comprise heating the gum arabic, for example, under the conditions disclosed herein. Accordingly, exemplary features and conditions disclosed herein in relation to heating are applicable to the methods according the first and second aspects set forth herein mutatis mutandis. Also, exemplary features and conditions disclosed herein in relation to the dissolution, filtering and spray drying steps, as well as other features relevant to the methods are applicable to the methods of the first and second aspects set forth herein mutatis mutandis.

In the first aspect, any suitable gum arabic may be provided. For example, the gum arabic provided may be a crude or unmodified gum arabic. For instance, gum arabic may be provided having a $M_w \leq 0.9 \cdot 10^6$ Da. However, it is also possible to provide gum arabic having a higher $M_w$.

The gum arabic provided (to be subjected to heating) may be in any suitable form, for instance in the form of kibble or in spray dried form. In one embodiment of the invention, gum arabic is provided which is not in spray dried form. This is advantageous if it is desired to produce solutions and/or emulsions having a relatively low turbidity. The gum arabic provided may be in particulate form. The particles can be of any size. A uniform particle size distribution is advantageous, since this facilitates uniform drying and/or heating. The average particle diameter can, for example, be between 0.1 mm-10 mm; 0.1 mm-5 mm; 1.8 mm-2.5 mm; or 2.0 mm-2.2 mm.

The heating may be performed using any suitable method including such as for example, an oil jacketed vacuum reactor (e.g., a Littleford), fluid bed reactor, and a microwave reactor. Suitable methods may include any method resulting in an increase of the M w of the gum arabic. For example, any of the methods of JP-H-2-49001 and JP-A-2000/166489 may be used. It is also possible to use one or more of the conditions described in WO 2004/089991 or EP 1 666 502 A1, but this is not critical.

The heating may be performed at any suitable temperature. The methods according to the invention may, for example, comprise heating the gum arabic at a temperature of $\geq 100°$ C.; $\geq 105°$ C.; $\geq 110°$ C.; or $\geq 115°$ C. Heating at increased temperatures has the advantage of achieving either a desired Mw and/or Rg within a shorter period of time, or achieving within a certain period of time an increased Mw and/or Rg. There is no particular upper limit for heating the gum arabic. The methods according to the invention may, for example, comprise heating the gum arabic at a temperature of $\leq 180°$ C.; $\leq 160°$ C.; $\leq 150°$ C.; or $\leq 140°$ C. The methods according to the invention may, for example, comprise heating at a temperature between 100 and 180° C.; between 105 and 160° C.; between 110 and 150° C.; or between 115 and 140° C.

Preferred heating periods for achieving a desired Mw and/or Rg will generally depend on the heating temperature. The methods according to the first and second aspects described herein may, for example, comprise heating the gum arabic for at least 10 minutes, at least 30 minutes, or at least 1 hour. There is no particular upper limit for the period during which the gum arabic is heated. Heating may, for example, be for less than 48 hours, less than 10 hours, or less than 5 hours. The heating may, for example, be for a period of between 10 minutes and 48 hours, between 30 minutes and 10 hours, or between 1 and 5 hours. Heating may, for example, be performed at a temperature of between 115 and 140° C. and for a period of between 1 and 5 hours.

Heating may be performed at any suitable pressure. The method according to the invention described herein may, for example, comprise heating the gum arabic at reduced pressure or at atmospheric pressure. In one embodiment of the invention, conditions are chosen such that moisture is driven off in an efficient manner.

Heating may comprise heating gum arabic having any suitable loss-on-drying. The heating may, for example, comprise heating gum arabic having a loss-on-drying of $\leq 5$ wt. %, $\leq 3$ wt. %, or $\leq 1$ wt. %.

Heating may for instance be performed under such conditions that the heat-treated gum arabic has a Mw of $\geq 0.9 \cdot 106$ Da; $\geq 1.0 \cdot 106$ Da; $\geq 1.5 \cdot 106$ Da; or $\geq 2.0 \cdot 106$ Da. The skilled person will understand that these values may be achieved by applying a sufficiently high heating temperature for a sufficiently long time. Based on the teaching provided herein, the skilled person is able to select an appropriate heating time and heating period to achieve the exemplary values of the Mw defined herein. Obtaining heat-treated gum arabic having a Mw above the values mentioned above is found to have the advantage that the values of Mw and/or Rg resulting from the subsequent spray drying step are even higher.

Heating may, for example, be performed under such conditions that the heat-treated gum arabic has an Mw of $\leq 3.8 \cdot 106$ Da, $\leq 3.5 \cdot 106$ Da, or $\leq 3.0 \cdot 106$ Da. Keeping the Mw below these values has the advantage that the viscosity may be kept sufficiently low, such that the spray drying step, and the optional filtration, may be performed under optimal conditions.

Heating may, for example, be performed under such conditions that the heat-treated gum arabic has an Mw of between 0.9·106 Da and 3.8·106 Da, between 1.5·106. Da and 3.5·106 Da, or between 2.0·106 Da and 3.0·106 Da.

The method according to the second aspect described herein comprises providing gum arabic having an Mw of ≥0.9·106 Da. The method according to the second aspect described herein may, for example, comprise providing gum arabic having an Mw of ≥1.0·106 Da, ≥1.5·106 Da, or ≥2.0·106 Da. The method according to the second aspect described herein may, for example, comprise providing gum arabic having an Mw of ≤3.8·106 Da, ≤3.5·106 Da, or ≤3.0·106 Da. The method according to the second aspect of the invention may, for example, comprise providing gum arabic having an Mw of between 0.9·106 Da and 3.8·106 Da, between 1.5·106. Da and 3.5·106 Da, or between 2.0·106 Da and 3.0·106 Da. The skilled person will understand that the advantages of the values for Mw as set forth with respect to the first aspect of the invention apply to the second aspect of the invention mutatis mutandis.

The methods according to the first and second aspects described herein comprise dissolving the heat-treated gum arabic and/or the gum arabic having the $M_w$ as defined in a solution. Generally, the solution is an aqueous solution. The concentration of gum arabic in the solution is not critical. If the concentration is relatively low, the spray drying step may be less economical. If the concentration is relatively high, the viscosity becomes relatively high, which may make the spray drying less efficient. A solution may, for example, be obtained containing between 5 and 50 wt. % of the gum arabic, between 10 and 40 wt. % of the gum arabic, or between 20 and 30 wt. % of the gum arabic.

The solution may have any suitable viscosity. The viscosity may, for example, be such that the conditions for spray drying are optimal. The solution may, for example, have a viscosity of ≥100 cP or ≥140 cP. The solution may, for example, have a viscosity of ≤250 cP or ≤200 cP. The solution may, for example, have a viscosity of between 100 and 250 cP or between 140 and 200 cP. As used herein, the viscosity of the solution is measured at a temperature of 25° C.

The methods according to the first and second aspects described herein may, for example, comprise filtering the solution prior to spray drying. Filtering has the advantage that gel particles, which may, for instance, have formed during heating, may be removed. The filtration step may also include carbon filtration to remove unwanted odor and taste developed during the heat treatment. The skilled person is able to select appropriate filters for removing such gel particles. For example, a filter having a pore size between 0.1 and 100 ☐m or between 1 and 50 ☐m may be used.

Spray drying is a technique well-known to the skilled person and may be performed in any suitable manner. The spray drying may, for example, be effected at an inlet temperature of between 100 and 250° C. and at an outlet temperature of between 70 and 120° C.

The method according to the first and second aspects described herein may be used to modify any gum arabic, including, e.g., gum arabic from *Acacia Senegal* and gum arabic from *Acacia Seyal*. The gum arabic may, for example, be from *Acacia Senegal*.

Gum Arabic

The third aspect of the invention provides a gum arabic obtained or obtainable by the method according to the first or second aspect of the invention.

The fourth aspect of the invention provides a gum arabic from *Acacia Senegal* having (i) a weight average molecular weight (Mw) of ≥3.8·106 Da and/or (ii) a RMS-radius of gyration (Rg) of ≥140 nm.

A skilled person understands that exemplary features and characteristics of the gum arabic disclosed herein are applicable to the gum arabic of the third and fourth aspects of the invention mutatis mutandis. As used herein, the gum arabic of the third and fourth aspects described herein will also be referred to as a gum arabic according to the invention.

The gum arabic according to the invention may, for example, have an Mw of ≥3.8·106 Da, ≥4.0·106 Da, ≥4.2·106 Da, or ≥4.5·106 Da. The emulsifying properties of the gum arabic according to the invention were found to improve with increasing Mw. There is no particular upper limit for the Mw. The gum arabic according to the invention may, for example, have an Mw of ≤8.0·106 Da or ≤6.5·106 Da. The gum arabic according to the invention may, for example, have an Mw of between 3.8·106 and 8.0·106 Da, between 4.0·106 and 6.5·106 Da, or between 4.5·106 and 6.5·106 Da.

The gum arabic according to the invention may, for example, have an Rg of ≥140 nm, ≥150 nm, or ≥160 nm. The emulsifying properties of the gum arabic according to the invention were found to improve with increasing Rg. There is no particular upper limit for the Rg. The gum arabic according to the invention may, for example, have an Rg of ≤250 nm, ≤200 nm, or ≤190 nm. The gum arabic according to the invention may, for example, have an Rg of between 140 and 250 nm, between 150 and 200 nm, or between 160 and 190 nm.

The gum arabic according to the invention may, for example, be a spray dried gum arabic. The gum arabic according to the invention may, for example, be obtainable by spray drying heat-treated gum arabic and/or by spray drying gum arabic having an Mw of ≥0.9·106 Da.

The gum arabic according to the invention may, when present as a solution, have a relatively low viscosity. The gum arabic according to the invention may, for example, have a viscosity (20%) of ≤500 cP, wherein viscosity (20%) refers to the viscosity of a 20 wt. % solution of the gum arabic in water, measured a temperature of 25° C. The gum arabic according to the invention may, for example, have a viscosity (20%) of ≤400 cP, ≤300 cP, or ≤250 cP. There is no particular lower limit for the viscosity (20%). The viscosity (20%) may, for example, be ≥50 cP, ≥100 cP, or ≥150 cP. The viscosity (20%) may, for example, be between 50 and 500 cP, between 50 and 400 cP, between 100 and 300 cP, or between 150 and 250 cP.

The gum arabic according to the invention may have any suitable value for the polydispersity (P). The gum arabic according to the invention may, for example, have a (P) of ≥6.0, ≥7.0, or ≥8.0. The prior art advocates keeping the (P) low in order to obtain sufficient emulsifying properties. Surprisingly, it was found that gum arabic according to the invention exhibits excellent emulsifying ability, even when the (P) is high, for example, above the values mentioned above. There is no particular upper limit for the (P). The gum arabic according to the invention may, for example, have a (P) of ≤15 or ≤12. The gum arabic according to the invention may, for example, have a (P) of between 6.0 and 15, between 7.0 and 12, or between 8.0 and 12.

The gum arabic according to the invention may, for example, have an arabinogalactan protein (AGP) content of ≥18 wt. %, ≥20 wt. %, or ≥22 wt. %. There is no particular upper limit for the AGP content. The gum arabic according to the invention may, for example, have an AGP content of ≤30 wt. % or ≤28 wt. %. The gum arabic according to the invention may, for example, have an AGP content between 18 and 30 wt. %, between 18 and 28 wt. %, or between 20 and 28 wt. %.

Uses and Applications

The gum arabic according to the invention provides excellent emulsifying properties.

A fifth aspect of the invention provides an emulsifier composition comprising a gum arabic according to the invention. The emulsifier composition may, for example, contain water preservatives, acid, solubilizing aids (for instance propylene glycol or glycerin), oils, weighing agents, antioxidants, and/or colors.

A sixth aspect of the invention provides an emulsion comprising a gum arabic according to the invention and/or the emulsifier composition according to the fifth aspect of the invention. The emulsion may, for example, comprise a continuous aqueous phase and a dispersed oil phase. The emulsion of the sixth aspect may further comprise an optional weighing agent.

The oil phase may comprise any suitable oil, for instance an essential oil, a terpene-containing oil an extract, an oleoresin, a flavonoid, a □-carotene, spirulina extract, paprika extract, or turmeric extract.

The oil phase may comprise a color oil. The skilled person will understand that color oil in the context of the present invention refers to a hydrophobic compound which is intended to deliver color or turbidity. The color oil may for instance be a flavonoid, a □-carotene, spirulina extract, paprika extract, or turmeric extract.

The oil phase may comprise a flavor oil. The skilled person will understand that flavor oil in the context of the present invention refers to a hydrophobic compound which is intended to deliver taste or aroma, or sensory modulation. The flavor oil may for instance be an essential oil, a terpene-containing oil an extract, or an oleoresin. Exemplary flavor oils include mint oil or citrus oil, for instance an orange oil, lemon oil, lime oil or grapefruit oil.

The emulsion according to the invention described herein is not limited to any particular kind of emulsion. For example, the emulsion may be a flavor emulsion, a color emulsion, a beverage emulsion, a fragrance emulsion, a vitamin emulsion, or a food emulsion.

The emulsion according to the invention may have any suitable weight ratio of gum arabic according to the invention to oil. As used herein, the weight of the oil refers to the weight of the oil plus the weight of any weighing agent, if present. Weighing agents are well known to the skilled person and include, for example, ester gum, brominated vegetable oil, dammar gum, and sucrose acetate isobutarate (SAIB). The gum arabic according to the invention enables, due to its excellent emulsifying properties, a low usage of gum arabic. Advantageously, the emulsion according to the invention has a weight ratio of gum arabic to oil of ≤1:1.2, ≤1:1.5, or ≤1:2.0. There is no particular lower limit for the weight ratio of gum arabic to oil. The emulsion may, for example, have a weight ratio of gum arabic to oil of ≥0.2:1, ≥0.3:1, or ≥0.4:1. The emulsion according to the invention may, for example, have a weight ratio of gum arabic to oil of between 0.2:1 to 1:1.2, between 0.3:1 to 1:1.5, or between 0.4:1 and 1:2.0.

The emulsion according to the invention may have any suitable oil content. The gum arabic according to the invention enables, due to its excellent emulsifying properties, emulsions having a high oil content to be stabilized. The emulsion according to the invention may, for example, have an oil content of ≥15 wt. % or ≥20 wt. %. There is no particular upper limit of the oil content for an emulsion according to the invention. The emulsion may, for example, have an oil content of ≤30 wt. % or ≤25 wt. %. The emulsion may, for example, have an oil content of between 15 and 30 wt. % or between 20 and 25 wt. %.

The gum arabic according to the invention may be used in combination with other ingredients, for example, one or more ingredients selected from quillaja saponin, OSA-modified starch, tween, propylene glycol alginate, phospholipids (e.g. lecithin), gelatins, proteins, pectin, sucrose esters, and mono- and/or diglycerides.

A seventh aspect of the invention is directed to the use of the gum arabic according to the invention as an emulsifier.

An eighth aspect of the invention is directed to a method for preparing an emulsion according to the sixth aspect of the invention, said method comprising dispersing an oil phase in an aqueous phase using high pressure homogenization. A pressure of between 2000 and 30,000 psi (between 137.9 and 2069 bar) may, for example, be applied. Any suitable number of passes may be used. The skilled person can determine the optimum number of passes.

A ninth aspect of the invention is directed to a product containing an effective amount of an emulsion and/or emulsifier composition according to the invention described herein. The products may, for example, include food and beverage products, supplements, cannabinoid products, pharmaceuticals, nutraceuticals, infant products, paper products, animal care products, household products, agricultural products, agricultural applications, industrial products, and personal care products.

Food and beverage products include, for example, juices; beverages; sodas; instant coffees and teas; sauce and gravies; soups; cereals; dressings; bakery products; instant and cook-up mixes; nondairy creamers; ice cream; icings; salad dressings; and sweetened condensed creamers.

Examples of beverages include, for example, ready-to-drink products that are carbonated (e.g., colas or other sodas, soft drinks, sparkling beverages, beverages containing cannabinoid products, and malts) or non-carbonated (e.g., fruit juices, nectars, vegetable juices, sports drinks, energy drinks, enhanced water, coconut waters, teas, coffees, cocoa drinks, beverages containing milk, beverages containing cereal extracts, beverages containing cannabinoid products, smoothies, and alcoholic beverages), and powdered beverage products that are to be combined with a liquid base, such as, e.g., water, milk, or club soda.

Personal care products include, for example, antiperspirants, deodorants, soaps, fragrances, cosmetics, hair care products (such as, e.g., hair sprays, mousses, shampoos, and cream rinses), bath products, and gels.

Paper products include, for example, diapers, sanitary napkins, paper towels, tissues, and toilet tissues.

Animal care products include, for example, animal foods and kitty litter.

Household products include, for example, cleaners, detergents, fabric softeners, and air fresheners.

Various Emulsions According to the Sixth Aspect of the Invention

The gum arabic according to the invention offers particular advantages in the preparation of emulsions comprising oil having a relatively low density such as for instance flavor oils.

A large density difference between the discrete (oil) phase and continuous (aqueous) phase drives instability and makes emulsions difficult to stabilize. According to Stoke's Law, the larger the density difference between the discrete and continuous phase, the faster the oil droplets dispersed in the continuous phase may cream to the top or sediment to the bottom of the emulsion—leading to increased particle sizes due to coalescence and eventually physical separation of the emulsion. Once diluted into a beverage, due to the increased particle size, these emulsion may separate and form a ring around the top of the beverage—as the particle size also plays an important role in the speed of movement of oil droplets dispersed in continuous phase.

To solve this problem, weighting agents are used in the art to increase the density of the discrete phase so it more closely matches the continuous phase, thus reducing the velocity of dispersed oil droplets—increasing stability. As is well known to the skilled person, weighting agents refer to oil soluble ingredients intended to increase the specific gravity of a particular oil and exhibit specific gravities greater than that of water. However, there are several disadvantages to using weighting agents that has led to a desire for their removal: they have a poor consumer perception, there are regulatory limits on their use, they contribute significant cost to the formulation, they are time consuming to process, and they tend to cause sedimentation in beverages. Therefore, there is a strong desire in the food and beverage industry for emulsions that do not require weighing agents or require lower amounts of weighing agents. The present invention addresses this need. More particularly, the gum arabic according to the invention enables an emulsion comprising an oil having a relatively low density to be obtained, wherein the amount of weighting agent may be reduced or wherein weighting agent is not even needed.

In view of the above, there is provided an emulsion according to the sixth aspect of the invention, wherein the oil phase comprises an oil having a density ≤0.90 g/ml, for instance having a density between 0.70 and 0.90 g/ml, for instance between 0.80 and 0.90 g/ml and, optionally, a vegetable oil.

The oil having a density ≤0.90 g/ml may be any suitable oil having said density. The oil having a density ≤0.90 g/ml may for instance be an essential oil, a terpene-containing oil an extract or an oleoresin. The oil having a density ≤0.90 g/ml may for instance be a flavor oil as discussed hereinafter.

There is further provided an emulsion according to the sixth aspect of the invention, wherein the oil phase comprises (i) a flavor oil and, optionally, (ii) a vegetable oil. The skilled person will understand that flavor oil in the context of the present invention refers to a hydrophobic compound which is intended to deliver taste or aroma, or sensory modulation. The flavor oil may for instance be an essential oil, a terpene-containing oil an extract, or an oleoresin. Exemplary flavor oils include mint oil or citrus oil, for instance an orange oil, lemon oil, lime oil or grapefruit oil.

There is further provided an emulsion according to the sixth aspect of the invention, wherein the oil phase comprises a vegetable oil. The vegetable oil may be any triglyceride oil extracted from seeds. Any suitable vegetable oil may be used, for instance a vegetable oil selected from medium chain triglyceride (MCT) oil, coconut oil, corn oil, cottonseed oil, olive oil, palm oil, peanut oil, rapeseed oil, safflower oil, sesame oil, soybean oil, sunflower oil, canola oil, and mixtures thereof. Generally, a vegetable oil has a density below that of water, hence below 1.0 g/ml.

It was found that the presence of a vegetable oil as disclosed hereinabove facilitates obtaining a stable emulsion comprising an oil having a low density as disclosed hereinabove. Without wishing to be bound by any scientific theory, it is believed that a vegetable oil having a density between the density of the oil having a low density as disclosed hereinabove and the density of water may assist to minimize the density difference between the discrete and continuous phase, thereby further enhancing the stability of the emulsion.

Based on the teaching provided herein, the skilled person is able to determine suitable ratios between (i) the oil having a density ≤0.90 g/ml or the flavor oil and (ii) the vegetable oil. The weight ratio of (i) oil having a density ≤0.90 g/ml or flavor oil to (ii) vegetable oil may be between 1:0.1 and 1:9, for instance between 1:3 and 3:1.

The skilled person will understand that an oil phase comprising (i) an oil having a density ≤0.90 g/ml and, (ii) a vegetable oil may be an oil phase wherein the oil having a density ≤0.90 g/ml is in admixture with the vegetable oil and/or an oil phase obtained or obtainable by admixing the oil having a density ≤0.90 g/ml with the vegetable oil.

Likewise, the skilled person will understand that an oil phase comprising (i) a flavor oil and (ii) a vegetable oil may be an oil phase wherein the flavor oil is in admixture with vegetable oil and/or an oil phase obtained or obtainable by admixing the flavor oil with the vegetable oil.

There is further provided an emulsion according to the sixth aspect of the invention, wherein the emulsion is free of a weighting agent.

Advantageously, the emulsion according to the sixth aspect of the invention has a weight ratio of gum arabic to oil of ≤1:1.2, ≤1:1.5, or ≤1:2.0. There is no particular lower limit for the weight ratio of gum arabic to oil. The emulsion may, for example, have a weight ratio of gum arabic to oil of ≥0.2:1, ≥0.3:1, or ≥0.4:1. The emulsion according to the invention may, for example, have a weight ratio of gum arabic to oil of between 0.2:1 to 1:1.2, between 0.3:1 to 1:1.5, or between 0.4:1 and 1:2.0. The skilled person will understand that, at used herein, the weight of the oil refers to the sum weight of entire oil phase.

The emulsion according to the sixth aspect of the invention may have any suitable oil content. The gum arabic according to the invention enables, due to its excellent emulsifying properties, emulsions having a high oil content to be stabilized. The emulsion according to the invention may, for example, have an oil content of ≥15 wt. % or ≥20 wt. %. There is no particular upper limit of the oil content for an emulsion according to the invention. The emulsion may, for example, have an oil content of ≤30 wt. % or ≤25 wt. %. The emulsion may, for example, have an oil content of between 15 and 30 wt. % or between 20 and 25 wt. %. As discussed above, the skilled person will understand that the weight of the oil refers to the sum weight of entire oil phase.

Subject matter contemplated by the present disclosure is set out in the following numbered embodiments:

1. A method for producing modified gum arabic, the method comprising: providing gum arabic; heating said gum arabic, resulting in heat-treated gum arabic; dissolving said heat-treated gum arabic in a solution; optionally, filtering said solution containing said dissolved gum arabic; and subjecting said solution containing said dissolved gum arabic to spray-drying.
2. The method according to embodiment 1, wherein said heating results in heat-treated gum arabic having a weight average molecular weight ($M_w$) of $\geq 0.9 \cdot 10^6$ Da, $\geq 1.0 \cdot 10^6$ Da, $\geq 1.5 \cdot 10^6$ Da, $\geq 2.0 \cdot 10^6$ Da, $\leq 4.0 \cdot 10^6$ Da, $\leq 3.5 \cdot 10^6$ Da, or $\leq 3.0 \cdot 10^6$ Da.

3. The method according to embodiment 1 or 2, wherein said heating is at a temperature of ≥100° C., ≥105° C., ≥110° C., ≤180° C., ≤160° C., or ≤145° C.
4. The method according to any preceding embodiment, wherein said heating is for a period of: at least 10 minutes, at least 30 minutes, at least 1 hour, less than 48 hours, or less than 5 hours.
5. The method according to any preceding embodiment, wherein said heating comprises heating gum arabic having a loss-on-drying of ≤5%, ≤3%, or ≤1%.
6. A method for producing modified gum arabic, the method comprising: providing gum arabic having a weight average molecular weight ($M_w$) of ≥0.9·10$^6$ Da, ≥1.0·10$^6$ Da, ≥1.5·10$^6$ Da, ≥2.0·10$^6$ Da, ≤4.0·10$^6$ Da, ≤3.5·10$^6$ Da, or ≤3.0·10$^6$ Da; dissolving said gum arabic in a solution; optionally, filtering said solution containing said dissolved gum arabic; and subjecting said solution containing said dissolved gum arabic to spray-drying.
7. The method according to embodiment 6, wherein said gum arabic having said $M_w$ is provided by heating gum arabic.
8. The method according to embodiment 7, wherein said gum arabic having said $M_w$ is provided by heating gum arabic under the conditions as defined in any one of claims 3 to 5.
9. The method according to any preceding embodiment, wherein said dissolving results in a solution containing between 5 and 50 wt. %, between 10 and 40 wt. %, or between 20 and 30 wt. % of said gum arabic.
10. The method according to any preceding embodiment, wherein said spray drying step is effected at an inlet temperature of between 100 and 250° C. and at an outlet temperature of between 70 and 120° C.
11. The method according to any preceding embodiment, wherein said gum arabic is gum arabic from *Acacia Senegal*.
12. Gum arabic obtainable by the method according to any preceding embodiment.
13. A gum arabic from *Acacia Senegal* having (i) a weight average molecular weight ($M_w$) of ≥3.8·10$^6$ Da and/or (ii) an RMS-radius of gyration ($R_g$) of ≥140 nm.
14. The gum arabic according to embodiment 13, which is a spray dried gum arabic.
15. The gum arabic according to embodiment 13 or 14, which is obtainable by spray drying of heat-treated gum arabic and/or by spray drying of gum arabic having a $M_w$ of ≥0.9·10$^6$ Da.
16. The gum arabic according to any one of embodiments 13 to 15, having a viscosity (20%) of ≤500 cP, wherein viscosity (20%) refers to the viscosity of a 20 wt. % solution of the gum arabic in water, measured a temperature of 25° C.
17. The gum arabic according to any one of embodiments 13 to 16, having a viscosity (20%) of ≤400 cP, ≤300 cP, ≤250 cP, ≥50 cP, ≥100 cP, or ≥150 cP.
18. The gum arabic according to any one of embodiments 13 to 17, having a $M_w$ of ≥3.8·10$^6$ Da, ≥4.0·10$^6$ Da, ≥4.2·10$^6$ Da, ≥4.5·10$^6$ Da, ≤8.0·10$^6$ Da, or ≤6.5·10$^6$ Da.
19. The gum arabic according to any one of embodiments 13 to 18, having a $R_g$ of ≥140 nm, ≥150 nm, ≥160 nm, ≤250 nm, or ≤200 nm.
20. The gum arabic according to any one of embodiments 13 to 19, having a polydispersity (P) of ≥6.0, ≥7.0, ≥8.0, ≤15, or ≤12.
21. The gum arabic according to any one of embodiments 13 to 20, having an arabinogalactan protein (AGP) content of ≥18 wt. %, ≥20 wt. %, ≥22 wt. %, ≤30 wt. %, or ≤28 wt. %.
22. The gum arabic according to any one of embodiments 13 to 21, wherein said gum arabic is obtained or obtainable by the method according to any one of embodiments 1 to 12.
23. An emulsifier composition comprising the gum arabic according to any preceding embodiment.
24. An emulsion comprising the gum arabic according to any preceding embodiment and/or the emulsifier composition according to embodiment 23.
25. The emulsion according to embodiment 24, comprising a continuous aqueous phase and a disperse oil phase.
26. The emulsion according to embodiment 24 or 25, having a weight ratio of gum arabic to oil of ≤1:1.2, ≤1:1.5, ≤1:2.0, ≥0.2:1, or ≥0.4:1.
27. The emulsion according to any one of embodiments 24 to 26, having an oil content of ≥15 wt. %, ≥20 wt. %, or ≤30 wt. %.
28. The emulsion according to any one of embodiments 24 to 27, wherein the oil phase comprises (i) an oil having a density ≤0.90 g/ml, for instance having a density between 0.70 and 0.90 g/ml, for instance between 0.80 and 0.90 g/ml and, optionally, (ii) a vegetable oil.
29. The emulsion according to any one of embodiments 24 to 27, wherein the oil phase comprises (i) a flavor oil and, optionally, (ii) a vegetable oil.
30. The emulsion according to any one of embodiments 24 to 29, wherein the oil phase comprises a vegetable oil.
31. The emulsion according to any one of embodiments 24 to 30, wherein said oil having a density ≤0.90 g/ml and/or said flavor oil is an essential oil, a terpene-containing oil or an extract an oleoresin.
32. The emulsion according to any one of embodiments 24 to 31, wherein said oil having a density ≤0.90 g/ml and/or said flavor oil is a mint oil or citrus oil, for instance an orange oil, lemon oil, lime oil or grapefruit oil.
33. The emulsion according to any one of embodiments 28 to 32, wherein said vegetable oil is selected from the group consisting of medium chain triglyceride (MCT) oil, coconut oil, corn oil, cottonseed oil, olive oil, palm oil, peanut oil, rapeseed oil, safflower oil, sesame oil, soybean oil, sunflower oil and canola oil.
34. The emulsion according to any one of embodiments 28 to 33, wherein the weight ratio of (i) oil having a density ≤0.90 g/ml or flavor oil to (ii) vegetable oil is between 1:0.1 and 1:9, for instance between 1:3 and 3:1.
35. The emulsion according to any one of embodiments 24 to 34, wherein emulsion is free of a weighting agent.
36. Use of the gum arabic according to any one of embodiments 12 to 22 as an emulsifier or a texturizer.
37. Method for preparing an emulsion according to any one of embodiments 24 to 27 or 30 to 35, the method comprising dispersing an oil phase in an aqueous phase using high pressure homogenization.
38. A food product comprising the gum arabic according to any one of embodiments 12 to 22 or 30 to 35.
39. A food product, comprising the emulsion according to any one of embodiments 24 to 27 or 30 to 35.
40. The food product according to embodiment 38 or 39, wherein said food product is a beverage.

Measurement Methods

As used herein, the weight average molecular weight (Mw), the RMS-radius of Gyration (Rg), the AGP content, and the polydispersity (P) were determined by using gel permeation chromatography with multiple angle laser light scattering (GPC-MALLS). Mw and P were determined when all of the peaks on the refractive index (RI) chromatogram were processed as one peak. The Rg and AGP content were determined when the data of the RI chromatogram was processed as two peaks, wherein the Rg and AGP content were determined from the first peak. The skilled person is well aware how this should be performed. For the sake of completeness the below description is provided.

GPC-MALLS—$M_w$, AGP Content, $R_g$, and (P)

The $M_w$, AGP content, $R_g$, and (P) were determined by using GPC-MALLS, which includes a multi detector system that has a multi angle laser light scattering detector (MALLS), an RI detector, and an ultraviolet (UV) detector coupled on-line, with the obtained data subsequently being processed via ASTRA Version 6.1 (Wyatt Technology Corporation) software. The MALLS detector was used to measure the molecular weight, the RI detector was used to measure the concentration of each component (composition ratio), and the UV detector was used to measure the protein content. Therefore, the molecular weight and composition were obtained without reference to a standard (i.e. gum arabic of known molecular weight).

Measurement Conditions Using GPC-MALLS

For GPC-MALLS, the following measurement conditions applied:
Column: Superose 6 Increase 10/300 GL (GE Life Sciences)
Flow Rate: 0.4 mL/minute
Eluent: 0.1 M $NaNO_3$
Preparation of sample: the sample to be analyzed was diluted with eluent (0.1M $NaNO_3$) and measured
Sample Concentration: 0.4% (w/w)
Injection Volume of Sample Solution: 100 μL
dn/dc: 0.141
Temperature: 25° C.
Detectors:
 MALLS Detector: Dawn Heleos II—18 Angles (Wyatt Technology Corp)
 RI Detector: Optilab T-rEX (Wyatt Technology Corp)
 UV Detector—Flexar UV/VIS (Perkin Elmer)

Weight Average Molecular Weight $M_w$ is defined as the $M_w$ calculated based on weight, when all of the peaks on the RI chromatogram were processed (via ASTRA 6.1 software) as one peak. The single peak on the chromatogram refers to the area from a "starting point" to an "ending point"—where the "starting point" is defined as the point on the RI chromatogram where the RI signal begins to rise from the baseline, and the "ending point" is defined as the point on the RI chromatogram where the RI signal returns (intersects) with the baseline of the chromatogram.

AGP Content

Based on the RI chromatogram obtained by the above-mentioned conditions, there are two visible fractions that elute: a high molecular weight fraction which elutes first (Peak 1) and a lower molecular weight fraction which elutes later (Peak 2). The mass fraction (%) of Peak 1 is equivalent to the AGP content (% by weight) of the gum arabic subjected to GPC-MALLS, which was determined after the data was processed via ASTRA 6.1 software. Between the aforementioned "starting point" and "ending point", the point where the RI signal showed a minimum was defined as the "boundary". The area between the "starting point" and the "boundary" were defined as RI peak fraction 1 (Peak 1) and the area between the "boundary" and the "ending point" were defined as RI peak fraction 2 (Peak 2). Peak 1 corresponded to the Arabinogalactan-protein (AGP) complex and thus the mass fraction (%) of Peak 1 is equivalent to the AGP content.

RMS Radius of Gyration $R_g$ is a size measurement and is the measure of the molecular size weighted by the mass distribution around the center of mass. In this case, radius of gyration refers to the z-average mean square radius determined by ASTRA 6.1 software. The z-average mean square radius is the parameter directly measured by the MALLS detector. $R_g$ is measured when processing the RI data as two peaks.

Polydispersity (P) is defined as the ratio of $M_w$ to number average molecular weight ($M_n$), calculated when the RI chromatogram obtained by the aforementioned method is processed by ASTRA Version 6.1 as one peak, and is calculated as $P=M_w/M_n$. As is well-known to the skilled person, (P) indicates when a given peak is homogenous with respect to its molar mass. A homogenous sample is one that contains only one type of molecule with a defined molecular weight, and thus the average mass is independent of the averaging method and (P) is equal to 1. If a sample contains a mixture of species of various molecular weights, the (P) will differ from 1.

Data Processing

Figure 2:
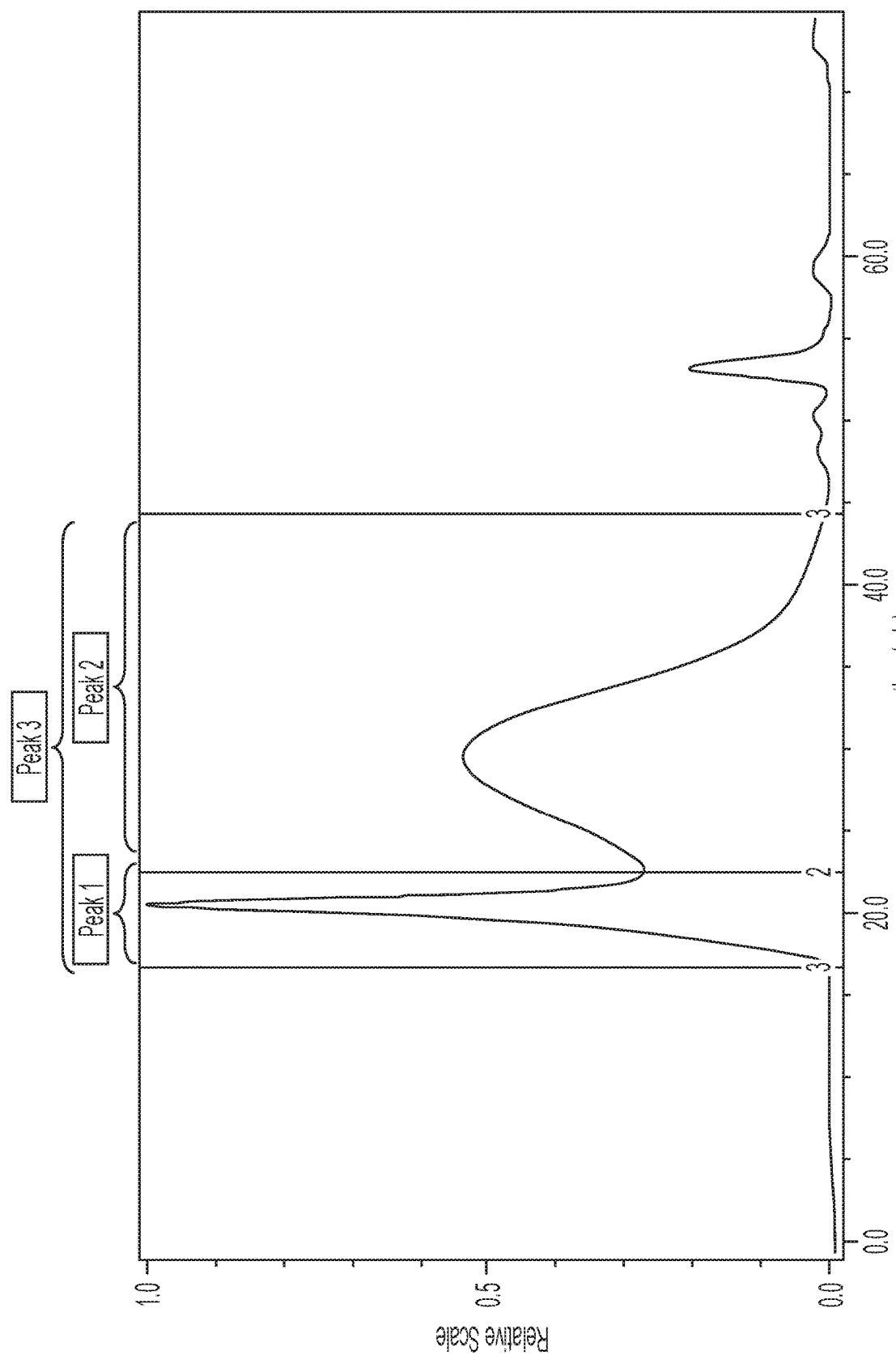
FIG. 2 provides an example of a refractive index (RI) chromatogram showing peak 1, peak 2, and peak 3 selections.

The skilled person is well aware how data processing should be performed. The following is provided for the sake of completeness.
Baseline Selection: The baseline is defined as the line that is used as a base for measurement. Baselines were set for all detectors used in the analysis (18 light scattering signals, 1 RI signal, and 1 UV signal). Baselines were selected by choosing the flattest "zero-points"—with one being before the "starting point" and the other being after the "ending point". This should create a line under the RI signal representative of a "no-signal" line with which the increase in RI signal will be compared.
Three peaks were selected during peak measurement. Reference is made to FIG. 2. Peak 1 is the peak from the "starting point" to the "boundary" and represents the AGP fraction. Peak 2 is from the "boundary" to the "ending point", and Peak 3 is from the "starting point" to the "ending point". AGP content and $R_g$ were determined from Peak 1, and molecular weight and (P) were determined from Peak 3.
Under "LS Analysis", the Berry plotting formalism was used to fit the LS data, as it is most suitable for molecules in the 100-200 nm range (such as the samples described in this invention). A 1st order fit degree was used, as the Berry model was found to be linear.
Enabled detectors: The angular dependence ($\sin2(\theta/2)$ vs $\sqrt{(K^*c/R(\theta))}$) graph was generated for the peak of the LS signal. When fitting the angular dependence data ($\sin2(\theta/2)$ vs $\sqrt{(K^*c/R(\theta))}$), the lowest and highest angle detectors (2-4 & 16-18) were de-selected to improve the fit of the data (measured as $R^2$). As the light scattering was not equal in all directions, the detectors at the widest angles tended to get poor signal, and thus had a low signal:noise ratio. Having these detectors enabled contributes less accurate results to the overall calculation of molecular weight and leads to significant error in the calculation of $M_w$. Therefore, wide angle detectors that contribute poorly (drive the $R^2$ down using a 1st order Berry fit model) were de-selected. The $R^2$ on the angular dependence fit were for instance >0.95 and for instance >0.99.

Results Fitting: In the "Results Fitting" tab of ASTRA 6.1, a model and order were chosen which maximized the fit $R^2$ for all three peaks when fitting both the molar mass data and the rms data. Model and order selection had a large impact on calculated molar mass and RMS radius, and thus the best fit was preferred. For the samples in this invention, a higher order exponential fit was generally used. $R^2$ for the fit was preferred to be >0.97 and more preferably >0.99.

Loss-on-Drying (LOD)

LOD (wt. %) refers to the amount of moisture loss by weight when the gum arabic was dried by heating at 105° C. until the sample no longer lost weight. LOD was determined by using a Mettler Toledo HB43-S Series Halogen Moisture Analyzer. The analyzer had two components, a heating unit and a balance unit. The initial weight of the material was recorded, and the sample was heated at 105° C. by a halogen lamp while the integrated balance continuously measured the sample weight. When the sample no longer lost weight, the instrument shut off and the final weight was recorded. The LOD was subsequently calculated from the total weight loss. For samples that were heat treated as granulated kibble, LOD was measured directly after heat treatment and then again once the product was spray dried.

Viscosity (10%)

Viscosity (10%) refers to the viscosity of a 10 wt. % solution of gum arabic in water, measured a temperature of 25° C.

30 g of a gum arabic sample was dissolved in 270 g deionized water (10% concentration) at 25° C. and overhead mixed (Manufacturer: Heidolph; Model: RZR 50) at 600 rpm for 2 hours in a 600 mL stainless steel beaker. A 100 mL sample was transferred to a 120 mL glass jar (2" diameter, 4 oz) and allowed to rest in a 25° C. water-bath for 30 minutes. The viscosity of the sample was subsequently measured (Brookfield LV, Spindle 61, 60 rpm, 25° C.).

Viscosity (20%)

Viscosity (20%) refers to the viscosity of a 20 wt. % solution of gum arabic in water, measured at a temperature of 25° C.

80 g of a gum arabic sample was dissolved in 320 g deionized water (20 wt. % concentration) at 25° C. and overhead mixed (Manufacturer: Heidolph; Model: RZR 50) at 600 rpm for 2 hours in a 600 mL stainless steel beaker. The viscosity of the sample was subsequently measured (Brookfield RV, Spindle 1, 20 rpm, 25° C.).

Turbidity

Viscosity solutions (20% gum arabic in deionized water) were measured at room temperature (20° C.) for turbidity using a Hach 2100N Turbidimeter.

Emulsifying Ability Median

The average particle diameter (median diameter) (micron) of each emulsion generated was measured using a particle size analyzer (Manufacturer: Malvern; Model: Mastersizer 2000) and (Manufacture: Beckman Coulter, Model: LS 13 320). The average particle diameter refers to the median particle size (d(0.50)).

Measurement of Particle Size

Average particle size denotes the geometric diameter measured according to "sieving method (JIS Z 8815 (1994))", (dry method). Eight test sieves in accordance with JIS Z 8801 (1994) were used: 5 mesh (4.00 mm), 7 mesh (2.83 mm), 10 mesh (2.00 mm), 12 mesh (1.68 mm), 14 mesh (1.41 mm), 18 mesh (1.00 mm), 35 mesh (0.50 mm), and 60 mesh (0.25 mm). The eight test sieves were stacked one atop the other in descending order with the largest mesh size (5 mesh-4.00 mm) at the top and the smallest mesh size (60 mesh-0.25 mm) at the bottom. 20.0 g gum arabic were placed on the top sieve and agitated according to the conditions listed below. The weight of the sample remaining on each sieve, post agitation, was measured and plotted on a semi-logarithmic graph in which the ordinate represents the accumulated weight (%) and the abscissa represents the logarithm of the sieve mesh size (mm). A log approximation line and associated approximation formula for the accumulated weight of sample dependent on sieve mesh size was obtained. The average particle diameter was obtained by using the approximation formula to determine the average mesh size (mm) where the accumulated weight (%) reaches 50% by weight of the total amount (20 g).

Agitating Conditions

Sieve: Rotap RX-29 (W. S. Tyler);
Agitating Period: 15 Minutes;
Oscillations per Minute: 278±10; and
Taps per Minute: 150±10.

EXAMPLES

All examples and comparative experiments described herein involved the use of gum arabic from *Acacia Senegal*.

Reference Experiments A and B

Example 1

Crude gum arabic kibble was procured as granulated kibble (average particle size=2.1 mm) from Central Trading Company (Sudan).

Reference Experiment A involved dissolving 2 kg of the crude kibble in water (obtaining a concentration of 25 wt. % gum arabic), filtering through a 25 micron filter bag, and spray drying at 216° C. inlet/104° C. outlet.

Reference Experiment B involved heat treating 9.1 kg of the crude kibble in a 3000 W vacuum microwave reactor (Marion Process Solutions, Marion, IA) at 132° C. and at reduced pressure (100 Torr/0.133 bar) for 40 minutes.

Example 1 involved dissolving heat-treated gum arabic obtained in Reference Experiment B in water (obtaining a concentration of 25 wt. % gum arabic), filtering through a 25 micron filter bag, and spray drying at 216° C. inlet temperature/104° C. outlet temperature.

The AGP content, Mw, Rg, and P were determined for each of Reference Experiment A, Reference Experiment B, and Example 1, which results are set forth in Table 1.

TABLE 1

| Sample | Processing | P | % AGP | $M_w$ (×10⁴ Da) | $R_g$ (nm) |
|---|---|---|---|---|---|
| Crude Kibble (2.1 mm) | None | 2.5 | 12.99 | 73.1 | 46.0 |
| Reference Experiment A | Spray drying of crude kibble | 2.4 | 13.65 | 75.9 | 61.6 |
| Reference Experiment B | Heating crude kibble at 132° C. for 40 mins | 5.2 | 23.45 | 280.0 | 132.3 |
| Example 1 | Spray drying product resulting from Reference Experiment B | 11.2 | 25.02 | 565.0 | 181.6 |

It is observed that spray drying of the heat-treated product leads to a substantial increase of the % AGP, Mw, and/or Rg.

The viscosity (10%) and viscosity (20%) of the product obtained in Example 1 were each analyzed and found to be 19.9 cP (viscosity 10%) and 187 cP (viscosity 20%).

Reference Experiment C

Example 2

Reference Experiment C involved heating 2.9 kg of crude kibble (the same as used in Reference Experiments A and B and Example 1) in a 3000 W vacuum microwave reactor at 154° C. for 15 minutes at reduced pressure (100 Torr/0.133 bar).

Example 2 involved dissolving the heat-treated gum arabic obtained in Reference Experiment C in water (obtaining a concentration of 25 wt. % gum arabic), filtering through a 25 micron filter bag, and spray drying at 216° C. inlet temperature/104° C. outlet temperature.

The AGP content, $M_w$, $R_g$, and (P) were determined, which results are set forth in Table 2.

TABLE 2

| Sample | Processing | P | % AGP | $M_w$ (×10⁴ Da) | $R_g$ (nm) |
|---|---|---|---|---|---|
| Crude Kibble (2.1 mm) | None | 2.5 | 12.99 | 73.1 | 46.0 |
| Reference Experiment C | Heating crude kibble at 154° C. for 15 min | 5.7 | 23.15 | 245.0 | 119.0 |
| Example 2 | Spray drying product resulting from Reference Experiment C | 9.3 | 24.28 | 432.0 | 179.5 |

It is observed that spray drying of the heat-treated product leads to a substantial increase of the % AGP, Mw, and/or Rg.

The viscosity (10%) and viscosity (20%) of the product obtained in Example 2 were each analyzed and found to be 19.7 cP (viscosity 10%) and 179 cP (viscosity 20%).

Reference Experiment D

Example 3

Reference Experiment D involved heat-treating 5.9 kg of crude kibble in a 22-liter oil-jacketed vacuum reactor (B&P Littleford, Saginaw, MI) at 138° C. for 2 hours Example 3 involved dissolving the heat-treated gum arabic obtained in Reference Experiment D in water (obtaining a concentration of 25 wt. % gum arabic), filtering through a 25 micron filter bag, and spray drying at 216° C. inlet temperature/104° C. outlet temperature.

The AGP content, weight average molecular weight ($M_w$), and RMS-radius of gyration ($R_g$) were determined. The results have been shown in Table 3.

TABLE 3

| Samples | Processing | P | % AGP | $M_w$ (×10⁴ Da) | $R_g$ (nm) |
|---|---|---|---|---|---|
| Crude Kibble (2.1 mm) | None | 2.1 | 13.79 | 77.7 | 50.8 |
| Reference Experiment D | Heating crude kibble at 138° C. for 120 minutes | 4.5 | 23.92 | 217.0 | 92.5 |
| Example 3 | Spray drying product resulting from Reference Experiment D | 6.1 | 26.48 | 392.0 | 142.6 |

It is observed that spray drying the heat-treated product leads to a substantial increase of the % AGP, Mw, and/or Rg.

The viscosity (10%) and viscosity (20%) of the product obtained in Example 3 were each analyzed and found to be 21.2 cP (viscosity 10%) and 201 cP (viscosity 20%).

Reference Experiment E

Example 4

Reference Experiment E involved heat-treating 5.9 kg of crude kibble in a 22-liter oil-jacketed vacuum reactor (Littleford) at 143° C. for 2 hours Example 4 involved dissolving heat-treated gum arabic obtained in Reference Experiment E in water (obtaining a concentration of 25 wt. % gum arabic), filtering through a 25 micron filter bag, and spray drying at 216° C. inlet temperature/104° C. outlet temperature.

The AGP content, $M_w$, and $R_g$ were determined, which results are set forth in Table 4.

TABLE 4

| Samples | Processing | P | % AGP | $M_w$ (×10⁴ Da) | $R_g$ (nm) |
|---|---|---|---|---|---|
| Crude Kibble (2.1 mm) | None | 2.1 | 13.79 | 77.7 | 50.8 |
| Reference Experiment E | Heating crude kibble at 143° C. for 120 min | 5.4 | 26.11 | 267.0 | 98.6 |
| Example 4 | Spray drying product resulting from Reference Experiment E | 8.4 | 27.71 | 621.0 | 179.2 |

It is observed that spray drying the heat-treated product leads to a substantial increase of the % AGP, $M_w$, and/or $R_g$.

Reference Experiment F

A set of experiments was performed, where crude gum arabic (crude kibble) was heated at reduced pressure (635

Figure 3:
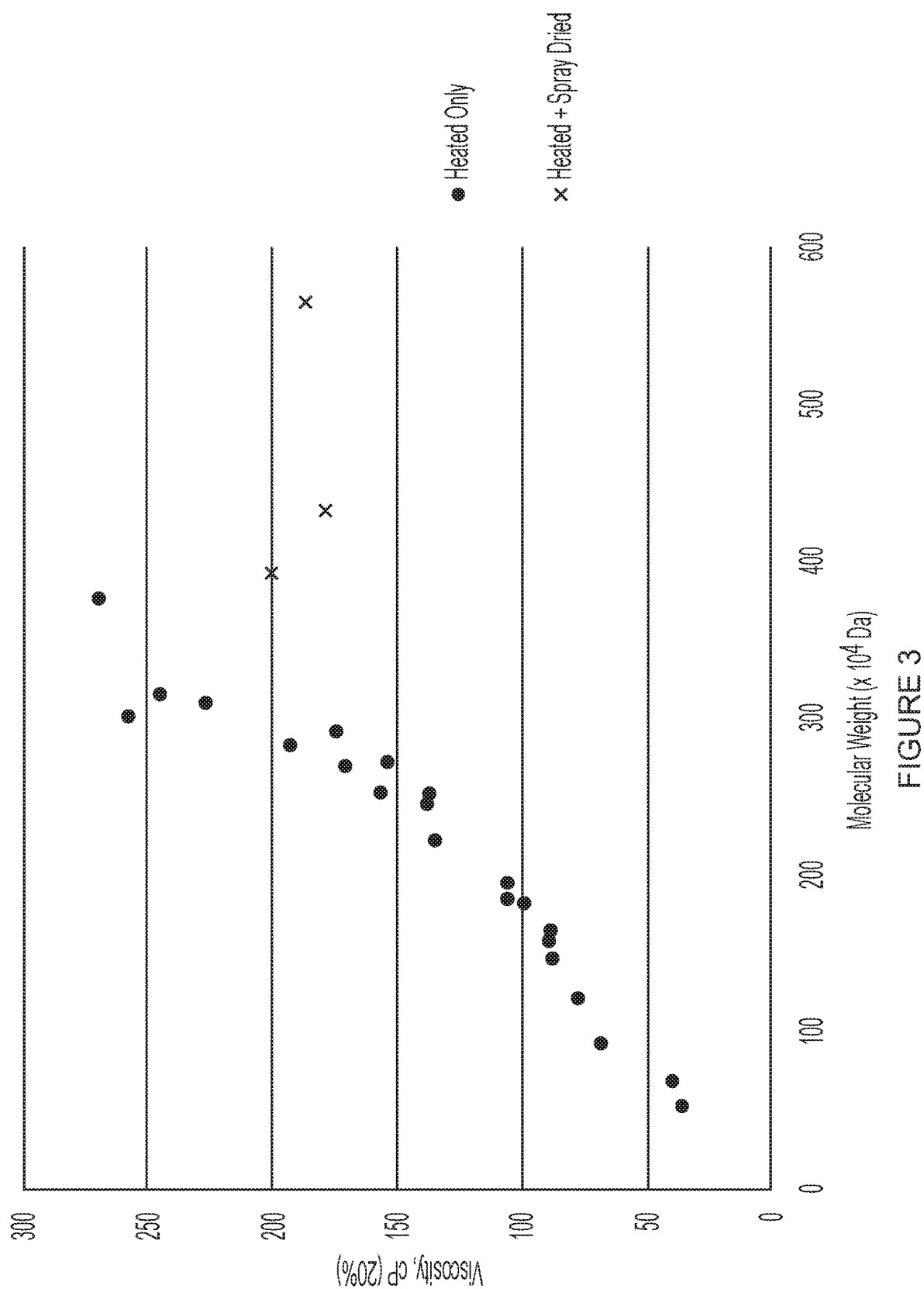
FIG. 3 is a graph showing the relation between Mw and viscosity (20%) for reference experiment F, as well as for examples 1, 2 and 3.

Ton). The temperature and heating time were varied. The results are set forth in Table 5 and plotted in FIG. 3

TABLE 5

| Sample | Control Used | Temp (° C.) | Time (min) | % AGP | Molecular Weight (×10⁴ Da) | Viscosity, cP (20%, Brookfield RV, 20 rpm) |
|---|---|---|---|---|---|---|
| Control A | N/A | N/A | N/A | 10.0 | 68.9 | 40 |
| Control B | N/A | N/A | N/A | 6.2 | 53.3 | 36 |
| F-1 | A | 140 | 30 | 18.7 | 158.3 | 89 |
| F-2 | A | 140 | 60 | 20.0 | 195.1 | 106 |
| F-3 | A | 140 | 90 | 21.9 | 245.8 | 138 |
| F-4 | A | 140 | 120 | 22.8 | 291.4 | 175 |
| F-5 | A | 140 | 150 | 23.5 | 309.4 | 227 |
| F-6 | B | 140 | 30 | 12.2 | 92.9 | 69 |
| F-7 | B | 140 | 60 | 14.3 | 121.8 | 78 |
| F-8 | B | 140 | 90 | 15.6 | 146.8 | 88 |
| F-9 | B | 140 | 120 | 17.4 | 184.5 | 106 |
| F-10 | B | 140 | 150 | 18.5 | 222.8 | 135 |
| F-11 | B | 140 | 180 | 19.5 | 252.7 | 157 |
| F-12 | B | 140 | 210 | 20.7 | 283.1 | 193 |
| F-13 | B | 140 | 240 | 21.6 | 301.3 | 258 |
| F-14 | A | 149 | 30 | 18.3 | 182.2 | 99 |
| F-15 | A | 149 | 60 | 20.3 | 272.1 | 154 |
| F-16 | A | 149 | 90 | 23.1 | 376.8 | 270 |
| F-17 | B | 149 | 30 | 16.7 | 164.8 | 89 |
| F-18 | B | 149 | 60 | 19.4 | 252.2 | 137 |
| F-19 | B | 149 | 90 | 21.7 | 315.2 | 246 |
| F-20 | A | 157 | 30 | 20.7 | 270.1 | 171 |

It is seen that the viscosity increases systematically with increasing % AGP and $M_w$.

Comparison of the data in tables 5 and 6 shows that the product obtained in Examples 1-3 (according to the invention) has a viscosity (20%) of about 200 cP or less for a Mw well above 380·10⁴ Da, whereas the product obtained in Reference Experiment F (heating, not followed by spray drying) has substantially higher values for the viscosity (20%), e.g. about 250 cP, for substantially lower values for Mw, e.g. about 300 10⁴ Da. Thus, the product obtained in Examples 1-3 combines a high molecular weight with a low viscosity.

Comparative Experiments I-III

Spray-dried crude gum arabic was heated in a forced air safety oven (Manufacturer: VWR; Model: 1350FMS) at different temperatures and for different times under atmospheric pressure conditions. As the oven was open to atmosphere the moisture could escape avoiding caking and sensory change and resulting in a loss of drying of 0%. The values for % AGP, $M_w$ and $R_g$ obtained by these heat-treatments is set forth in Table 7.

It is seen that, although % AGP, $M_w$ and/or $R_g$ are found to increase as a result of the heat treatment of the spray dried crude powder, the values are not as high as those found for the samples obtained by spray drying after heat-treatment.

TABLE 7

| Samples | Processing | P | % AGP | $M_w$ (×10⁴ Da) | $R_g$ (nm) |
|---|---|---|---|---|---|
| Crude spray dried powder | None | 1.9 | 11.35 | 67.2 | 42.3 |
| Comparative Experiment I | Heating spray dried powder at 110° C. for 24 hrs | 2.9 | 16.16 | 121.1 | 69.4 |
| Comparative Experiment II | Heating spray dried powder at 125° C. for 4 hrs | 2.6 | 16.98 | 116.7 | 70.1 |
| Comparative Experiment III | Heating spray dried powder at 125° C. for 6 hrs | 3.2 | 18.48 | 135.2 | 87.9 |

Reference Experiment F Versus Examples 1-3

Comparing Viscosities

The values for $M_w$ and for the viscosities of the product obtained in Examples 1-3 (obtained by heating, followed by spray drying) have been shown in Table 6.

TABLE 6

| Sample | % AGP | Molecular Weight (×10⁴ Da) | 10% Viscosity (cP) | 20% Viscosity (cP) |
|---|---|---|---|---|
| Reference Experiment A | 13.65 | 75.9 | 11.7 | 40.0 |
| Example 1 | 25.02 | 565.0 | 19.9 | 187 |
| Example 2 | 24.28 | 432.0 | 19.7 | 179 |
| Example 3 | 26.48 | 392.0 | 21.2 | 201 |

Example 5

Preparation and Analysis of Emulsions and Beverages

Emulsions (10 wt. % gum acacia, 20 wt. % oil phase) were prepared using the formulation set forth in Table 8.

TABLE 8

| | Ingredient | % (w/w) | Mass (g) |
|---|---|---|---|
| Aqueous Phase | Water | 69.55% | 695.5 |
| | Sodium Benzoate | 0.15% | 1.5 |
| | Citric Acid | 0.30% | 3.0 |
| | Acacia | 10.00% | 100.0 |
| Oil Phase | Orange Oil (1x Fold) | 9.60% | 96.0 |
| | Orange Oil (5x Fold) | 2.40% | 24.0 |
| | Ester Gum (weighting agent) | 8.00% | 80.0 |
| | Total | 100.00% | 1000.0 |

As gum arabic was used the gum arabic obtained in Reference Experiments A and B, Comparative Experiments I-II, as well as the gum arabic obtained in Examples 2, 3, and 4, respectively.

The emulsions were prepared as follows: 1.5 g sodium benzoate was dissolved in 695.5 g room temperature deionized water via overhead mixing for 5 minutes. 3.0 g citric acid was added to the solution and allowed to mix for 5 minutes. 100.0 g Gum acacia was added to the solution and allowed to mix for two hours. Simultaneously in a separate beaker, 96.0 g 1-fold orange oil was mixed with 24.0 g 5-fold orange oil via overhead mixing at room temperature for 5 minutes. 80.0 g ester gum was added to the oil solution and mixed for 2 hours. A pre-emulsion was made by adding the 200.0 g oil phase into the aqueous phase under high shear mixing conditions 5500 rpm for 2 minutes (Manufacturer: Ross; Model HSM-LCI-T). The pre-emulsion was further processed via high pressure homogenization (Manufacturer: APV) at 5000 psi for 2 passes ($1^{st}$ stage=4500 psi/$2^{nd}$ stage=500 psi). The particle size of the emulsion was immediately tested using a laser diffraction particle size analyzer (Manufacturer: Beckman Coulter) where the median particle size (d.(0.50)), % particles >0.6 μm, and % particles >1 μm were recorded. The emulsion was subsequently stored in an incubator at 57° C. for 24 hours to simulate 6-months shelf-life, after which the emulsion was tested again for median particle size, % particles >0.6 μm, and % particles >1 μm.

Beverages were prepared from the emulsions using the formulation set forth in Table 9.

TABLE 9

| Ingredient | % (w/w) | Mass (g) |
| --- | --- | --- |
| Sugar | 11.000% | 110.00 |
| Emulsion | 0.015% | 0.15 |
| Sodium Benzoate | 0.100% | 1.00 |
| Citric Acid | 0.300% | 3.00 |
| Yellow #5 | 0.004% | 0.04 |
| Yellow #6 | 0.004% | 0.04 |
| Water | 88.577% | 885.77 |
| Total | 100.000% | 1000.0 |

The beverages were prepared as follows: 110.00 g sugar was overhead mixed into 885.77 g deionized water at room temperature for 5 minutes. 3.00 g citric acid, 0.04 g Yellow #5, and 0.04 g Yellow #6 were added to the solution and mixed for 5 minutes. 0.15 g of the desired emulsion was added to the solution and lightly mixed. Two 10 oz (~300 mL) bottles were filled with the solution and capped. One bottle was stored vertically while the other was stored horizontally at room temperature without manipulation for 21 days. After 21 days, the beverage was visually examined without manipulation for the presence of a white ring at the top of the beverage (creaming of the flavor emulsion). The results are set forth in Table 10.

TABLE 10

| | Fresh Emulsion | | | Aged Emulsion (1 Day, 57° C.) | | | |
| --- | --- | --- | --- | --- | --- | --- | --- |
| Samples | Median Particle Size (μm) | % Part. >0.6 μm | % Part. >1.0 μm | Median Particle Size (μm) | % Part. >0.6 μm | % Part. >1.0 μm | Day 21 Beverage Ring? |
| Reference Experiment A | 0.40 | 4.64 | 0 | 0.49 | 34.2 | 19 | Yes |
| Reference Experiment B | 0.35 | 16.86 | 0.06 | 0.37 | 15.3 | 0.03 | Yes |
| Comparative Experiment I | 0.40 | 4.95 | 0 | 0.45 | 17.8 | 7.36 | Yes |
| Comparative Experiment II | 0.41 | 6.05 | 0 | 0.47 | 27 | 14.1 | Yes |
| Comparative Experiment III | 0.37 | 3.43 | 0 | 0.42 | 10.4 | 1.58 | Yes |
| Example 1 | 0.33 | 0.53 | 0 | 0.33 | 0.4 | 0 | No |
| Example 2 | 0.35 | 0.36 | 0 | 0.33 | 1.0 | 0 | No |

The small median particle sizes and low values for % particles >0.6 μm, and % particles >1 μm for both the fresh and aged emulsions, as well as the absence of a beverage ring show that the modified gum arabic according to the invention enables stable emulsions to be obtained, even for high quantities of oil (20 wt. %) and even when the content of emulsifier (10 wt. %) is very low compared to the oil phase.

Example 6

Analysis of Turbidity of Gum Arabic in Water Solutions

The turbidity of 20 wt. % solutions of gum arabic in water was analyzed for various forms of gum arabic. The results are shown in Table 11.

TABLE 11

| Sample | Processing | P | % AGP | $M_w$ (×10⁴ Da) | $R_g$ (nm) | Turbidity (NTU) |
|---|---|---|---|---|---|---|
| Crude Powder | Spray dried crude powder | 1.9 | 11.35 | 67.2 | 42.3 | 94.8 |
| Comparative Experiment I | Spray dried crude powder, subsequently heated at 110° C. for 24 hrs | 2.9 | 16.16 | 121.1 | 69.4 | 119 |
| Comparative Experiment II | Spray dried crude powder, subsequently heated at 125° C. for 4 hrs | 2.6 | 16.98 | 116.7 | 70.1 | 112 |
| Comparative Experiment III | Spray dried crude powder, subsequently heated at 125° C. for 6 hrs | 3.2 | 18.48 | 135.2 | 87.9 | 132 |
| Example 1 | Crude kibble, subsequently heated at 132° C. for 40 min followed by spray drying | 11.2 | 25.02 | 565.0 | 181.6 | 17.4 |
| Example 5 | crude kibble, subsequently heated at 135° C. for 4 hrs, followed by spray drying | 8.9 | 27.2 | 534.6 | 155.5 | 34.2 |

It was observed that the turbidity of the solutions containing gum arabic according to the invention is substantially lower than that of solutions containing heat treated spray dried powder. This is particularly useful when gum arabic is used as a texturizing agent, for example, in a sugar reduced beverage, such as, e.g., flavored water. The gum arabic according to the present invention can be added to the food product (i.e. sugar reduced flavored water) to replace the texture of the sugar while maintaining the low turbidity associated with flavored waters. Unmodified gum arabic or gum arabic produced via heat treating spray dried powder will result in increased turbidity of the food product which is visually undesirable.

Example 7

Preparation of Gum Arabic 9.1 kg of crude gum arabic kibble was heat treated in a microwave mixer under vacuum at 132° C. for 40 minutes. The heat treated gum arabic was dissolved in water (obtaining a concentration of 25 wt. % gum arabic), filtered through a 25 micron filter bag, and spray dried. The resulting product had an AGP of 25.02% and an $M_w$ of 565.0×10⁴ Da.

Example 8

Preparation of an Unweighted Flavor Emulsion

Emulsions (6 wt. % gum acacia, 12 wt. % oil phase) were prepared using the formulation set forth in Table 12.

TABLE 12

| | Ingredient | % (w/w) | Mass (g) |
|---|---|---|---|
| Aqueous Phase | Water | 81.55% | 815.5 |
| | Acacia | 6.00% | 60.0 |
| | Citric Acid | 0.30% | 3.0 |
| | Sodium benzoate | 0.15% | 1.5 |

TABLE 12-continued

| | Ingredient | % (w/w) | Mass (g) |
|---|---|---|---|
| Oil Phase | Lemon Oil | 6.00% | 60.0 |
| | MCT Oil | 6.00% | 60.0 |
| | Total | 100.00% | 1000.0 |

The emulsions were prepared as follows: 1.5 g sodium benzoate was dissolved in 815.5 g room temperature deionized water via overhead mixing for 5 minutes. 3.0 g citric acid was added to the solution and allowed to mix for 5 minutes. 60.0 g gum acacia prepared in accordance with example 7 was added to the solution and allowed to mix for two hours. Simultaneously in a separate beaker, 60.0 g lemon oil (Givaudan; Taste Essentials Nat Lemon CV-167-510-1) was mixed with 60.0 g MCT oil via overhead mixing at room temperature for 2 hours. A pre-emulsion was made by adding the 120.0 g oil phase into the aqueous phase under high shear mixing conditions 5500 rpm for 2 minutes (Manufacturer: Ross; Model HSM-LCI-T). The pre-emulsion was further processed via high pressure homogenization (Manufacturer: APV) at 5000 psi for 3 passes (1st stage=4500 psi/2nd stage=500 psi). The particle size of the emulsion was immediately tested using a laser diffraction particle size analyzer (Manufacturer: Beckman Coulter) where the d[4,3] mean particle size, median particle size (d.(0.50)), % particles >0.60 um, and % particles >1 um were recorded. The emulsion was subsequently stored in an incubator at 57° C. for 24 hours and separately at 40° C. for 4 weeks to accelerate shelf-life, after which the emulsion was tested again for d[4,3] mean particle size, median particle size (d.(0.50)), % particles >0.60 μm, and % particles >1 μm. The results are set forth in Table 13.

TABLE 13

| Sample | Spray dried Crude powder (see table 11) | Comparative Experiment III (see table 11) | Comparative Experiment IV* | Comparative Experiment V** | Example 7 |
|---|---|---|---|---|---|
| Fresh Emulsion | | | | | |
| Mean Particle Size (μm) | 1.360 | 0.391 | 0.530 | 0.426 | 0.341 |
| Median Particle Size (μm) | 1.330 | 0.474 | 0.456 | 0.458 | 0.379 |
| % Particles >0.6 μm | 60.1% | 12.0% | 21.9% | 17.2% | 3.6% |
| % Particles >1 μm | 54.3% | 0.018% | 7.5% | 0.0028% | 0.0% |
| Aged 24 hr @ 57° C. | | | | | |
| Mean Particle Size (μm) | 2.201 | 0.873 | 1.647 | 1.108 | 0.352 |
| Median Particle Size (μm) | 2.130 | 0.484 | 0.772 | 0.521 | 0.391 |
| % Particles >0.6 μm | 78.7% | 35.6% | 56.9% | 40.1% | 5.38% |
| % Particles >1 μm | 78.4% | 23.6% | 47.1% | 19.9% | 0.0% |
| Aged 4 weeks @ 40° C. | | | | | |
| Mean Particle Size (μm) | 2.256 | 1.354 | 2.356 | 1.615 | 0.350 |
| Median Particle Size (μm) | 2.320 | 0.815 | 1.768 | 0.570 | 0.387 |
| % Particles >0.6 μm | 80.3% | 56.9% | 60.8% | 48.9% | 4.07% |
| % Particles >1 μm | 80.0% | 48.1% | 52.0% | 34.2% | 0.0% |

*Emulsifying Gum 500i from Alland & Robert (commercially available)
**Eficacia XE from Nexira (commercially available)

The small mean and median particles size and low values for % particles >0.6 μm, and % particles >1 μm for both the fresh and aged emulsions, as well as the absence of a beverage ring (Table 15) show that the emulsion made from the gum arabic example 7 enables stable emulsions to be obtained even when the content of emulsifier (6 wt. %) is very low compared to the oil phase. Due to the large emulsion particle sizes and the presence of ringing in the beverage—the emulsions made from the commercially available gum arabic used in comparative experiments IV and V are not considered stable. The emulsions made from gum arabic obtained in Example 7 show minimal particle size growth over the accelerated shelf-life, which is not the case for the comparative experiments.

Example 9

Beverages Prepared From Unweighted Emulsions

Beverages were prepared from the emulsions obtained in Example 7 and comparative experiments IV and V using the formulations set forth in Table 14.

TABLE 14

| Ingredient | % (w/w) | Mass (g) |
|---|---|---|
| Sugar | 11.000% | 110.00 |
| Emulsion | 0.150% | 1.50 |
| Sodium Benzoate | 0.100% | 1.00 |
| Citric Acid | 0.300% | 3.00 |
| Yellow #5 | 0.004% | 0.04 |
| Yellow #6 | 0.004% | 0.04 |
| Water | 88.442% | 884.42 |
| Total | 100.000% | 1000.0 |

The beverages were prepared as follows: 110.00 g sugar was overhead mixed into 884.22 g deionized water at room temperature for 5 minutes. 3.00 g citric acid, 1.00 g sodium benzoate, 0.04 g Yellow #5, and 0.04 g Yellow #6 were added to the solution and mixed for 5 minutes. 1.50 g of the desired emulsion was added to the solution and lightly mixed to bring the flavor concentration in the beverage to 90 ppm. Two 10 oz. (~300 mL) bottles were filled with the solution and capped. One bottle was stored vertically while the other was stored horizontally at room temperature without manipulation for 15 days. After 15 days, the beverage was visually examined without manipulation for the presence of a white ring at the top of the beverage (creaming of the flavor emulsion). The results are set forth in Table 5.

TABLE 15

| Sample | Spray dried Crude powder (see table 11) | Comparative Experiment III (see table 11) | Comparative Experiment IV | Comparative Experiment V | Example 7 |
|---|---|---|---|---|---|
| Horizontal Storage, 21 d | RING | RING | RING | RING | NO RING |
| Vertical Storage, 21 d | RING | NO RING | RING | NO RING | NO RING |

Example 10

High Oil Load Unweighted Flavor EmulsionsEmulsions (10 wt. % gum acacia, 20 wt. % oil phase) were prepared using the formulation set forth in Table 16.

TABLE 16

| | Ingredient | % (w/w) | Mass (g) |
|---|---|---|---|
| Aqueous Phase | Water | 69.55% | 695.5 |
| | Acacia | 10.00% | 100.0 |
| | Citric Acid | 0.30% | 3.0 |
| | Sodium benzoate | 0.15% | 1.5 |
| Oil Phase | Lemon Oil | 10.00% | 100.0 |
| | MCT Oil | 10.00% | 100.0 |
| | Total | 100.00% | 1000.0 |

The emulsions were prepared and analyzed according to the procedure set forth in Example 3 with the difference being the amount of gum arabic, oil phase, and water used. The results are set forth in Table 17.

The small mean and median particles size and low values for % particles >0.6 μm, and % particles >1 μm for both the fresh and aged emulsions, as well as the absence of a definitive beverage ring (Table 19) show that the emulsion made from the gum arabic according to example 7 enables stable emulsions to be obtained even when the content of emulsifier (10 wt. %) is very low compared to the oil phase. There was trace amount of ringing observed in the beverage but was deemed acceptable. Due to the large emulsion particle sizes and the presence of ringing in the beverage—the emulsions made from the comparative experiments are not considered stable. The emulsions made from gum arabic obtained in Example 7 show minimal particle size growth over the accelerated shelf-life, which is not the case for the comparative experiments.

TABLE 17

| Sample | Spray dried Crude powder (see table 11) | Comparative Experiment III (see table 11) | Comparative Experiment IV* | Comparative Experiment V** | Example 7 |
|---|---|---|---|---|---|
| *Fresh Emulsion* | | | | | |
| Mean Particle Size (μm) | 1.503 | 0.476 | 1.021 | 0.654 | 0.482 |
| Median Particle Size (μm) | 1.352 | 0.485 | 0.760 | 0.657 | 0.529 |
| % Particles >0.6 μm | 69.3% | 27.6% | 65.3% | 60.3% | 33.3% |
| % Particles >1 μm | 56.8% | 0.91% | 34.1% | 6.37% | 0.02% |
| *Aged 24 hr @ 57° C.* | | | | | |
| Mean Particle Size (μm) | 2.069 | 0.598 | 1.703 | 1.098 | 0.480 |
| Median Particle Size (μm) | 2.156 | 0.510 | 1.003 | 0.706 | 0.510 |
| % Particles >0.6 μm | 78.6% | 35.2% | 73.2% | 64.7% | 29.6% |
| % Particles >1 μm | 72.8% | 10.7% | 51.1% | 21.2% | 2.06% |
| *Aged 4 weeks @ 40° C.* | | | | | |
| Mean Particle Size (μm) | 2.920 | 0.761 | 2.365 | 0.977 | 0.481 |
| Median Particle Size (μm) | 2.832 | 0.518 | 2.388 | 0.689 | 0.510 |
| % Particles >0.6 μm | 90.9% | 37.0% | 77.8% | 62.5% | 29.4% |
| % Particles >1 μm | 90.8% | 14.7% | 66.7% | 18.5% | 2.68% |

Example 11

Beverages Prepared From High Oil Load Weighting Agent-Free Emulsions

Beverages were prepared from the emulsions obtained in Example 10 using the formulations set forth in Table 18.

TABLE 18

| Ingredient | % (w/w) | Mass (g) |
|---|---|---|
| Sugar | 11.000% | 110.00 |
| Emulsion | 0.090% | 0.90 |
| Sodium Benzoate | 0.100% | 1.00 |
| Citric Acid | 0.300% | 3.00 |
| Yellow #5 | 0.004% | 0.04 |
| Yellow #6 | 0.004% | 0.04 |
| Water | 88.502% | 885.77 |
| Total | 100.000% | 1000.0 |

The beverages were prepared and analyzed according to the procedure set forth in Example 9 with the difference being the amount of flavor emulsion and water used. The results are set forth in Table 19.

TABLE 19

| Sample | Spray dried Crude powder (see table 11) | Comparative Experiment III (see table 11) | Comparative Experiment IV | Comparative Experiment V | Example 1 |
|---|---|---|---|---|---|
| Horizontal Storage, 15 d | RING | RING | RING | RING | NEGLIGIBLE RING |
| Vertical Storage, 15 d | RING | NO RING | RING | NO RING | NO RING |

The invention claimed is:

1. A method for producing modified gum arabic, the method comprising:
   providing gum arabic;
   heating said gum arabic, resulting in heat-treated gum arabic;
   dissolving said heat-treated gum arabic in a solution;
   subjecting said solution containing said dissolved gum arabic to spray-drying wherein the RMS-radius of gyration ($R_g$) of the modified gum arabic is at least 140 nm and the weight average molecular weight ($M_w$) is at least $3.8 \cdot 10^6$ Da.

2. The method according to claim 1, wherein the heating step heats gum arabic having a weight average molecular weight ($M_w$) of at least $0.9 \cdot 10^6$ Da.

3. The method according to claim 1, wherein said heating is at a temperature of at least 100° C.

4. The method according to claim 1, wherein said heating is for a period of: at least 10 minutes.

5. The method according claim 1, wherein said heating comprises heating gum arabic having a loss-on-drying of at most 5%.

6. The method according to claim 1 wherein the gum arabic has an average diameter of at least 1.8 mm.

7. The method according to claim 1, wherein said dissolving results in a solution containing between 5 and 50 wt. % of said gum arabic.

8. The method according to claim 1, wherein said gum arabic is gum arabic from *Acacia Senegal*.

9. A modified gum arabic from *Acacia Senegal* having an RMS-radius of gyration ($R_g$) of at least 140 nm and a weight average molecular weight ($M_w$) of at least $3.8 \cdot 10^6$ Da.

10. The gum arabic according to claim 9, capable of forming a 20 wt. % solution of the gum arabic in water, having a viscosity of at most than 500 cP, measured a temperature of 25° C.

11. The gum arabic according to claim 9 having a polydispersity (P) of at least 6.0.

12. The gum arabic according to claim 9 having an arabinogalactan protein (AGP) content of at least 18 wt. %.

13. An emulsion comprising modified gum arabic, an aqueous phase, an oil phase, wherein the gum arabic is used in a weight ratio of gum arabic to oil of less than 1:1.2 and wherein the oil content of the emulsion is at least 15%; and the RMS-radius of gyration ($R_g$) of the modified gum arabic is at least 140 nm and the weight average molecular weight ($M_w$) is at least $3.8 \cdot 10^6$ Da.

14. The emulsion according to claim 13 wherein the oil phase comprises an oil selected from the group consisting of an oil having a density ≤0.90 g/ml; a flavor oil a vegetable oil and mixtures thereof.

15. The emulsion according to claim 13 wherein said oil phase comprises an oil selected from the group consisting of an essential oil, a terpene-containing oil, an extract an oleoresin, a mint oil or citrus oil, for instance an orange oil, lemon oil, lime oil a grapefruit oil and mixtures thereof.

16. The emulsion according to claim 13 wherein the oil phase comprises an oil selected from the group consisting of medium chain triglyceride (MCT) oil, coconut oil, corn oil, cottonseed oil, olive oil, palm oil, peanut oil, rapeseed oil, safflower oil, sesame oil, soybean oil, sunflower oil, canola oil and mixtures thereof.

17. The emulsion according to claim 13 wherein the oil phase comprises a mixture of group (i) oil being an oil having a density ≤0.90 g/ml or flavor oil and a group oil (ii) being a vegetable oil and wherein the weight ratio of the group (i) oil to the group (ii) oil is between 1:0.1 and 1:9.

18. The emulsion according to claim 13 wherein emulsion is free of a weighting agent.

* * * * *